United States Patent [19]
Saha

[11] Patent Number: 5,463,723
[45] Date of Patent: Oct. 31, 1995

[54] METHOD AND APPARATUS FOR FILLING POLYGONS

[75] Inventor: Avijit Saha, Austin, Tex.

[73] Assignee: International Business Machines Corporation, Armonk, N.Y.

[21] Appl. No.: 123,510

[22] Filed: Sep. 20, 1993

[51] Int. Cl.$^6$ .................................................. G06T 11/00
[52] U.S. Cl. ...................... 395/134; 395/126; 395/129; 395/133; 395/163
[58] Field of Search .................. 395/118–120, 126–132, 395/133, 134, 143, 162–166

[56] References Cited

U.S. PATENT DOCUMENTS

| | | | |
|---|---|---|---|
| 4,368,463 | 1/1983 | Quilliam | 345/190 |
| 4,425,559 | 1/1984 | Sherman | 395/141 |
| 4,481,594 | 11/1984 | Staggs et al. | 395/131 |
| 4,646,076 | 2/1987 | Wiedenman et al. | 395/133 |
| 4,745,575 | 5/1988 | Hawes | 395/131 |
| 4,758,965 | 7/1988 | Liang et al. | 395/129 |
| 4,763,199 | 8/1988 | Suzuki | 358/445 |
| 4,897,805 | 1/1990 | Wang | 395/129 |
| 4,899,294 | 2/1990 | Easton et al. | 395/141 |
| 4,901,251 | 2/1990 | Sfarti | 395/129 |
| 4,962,468 | 10/1990 | Beauregard et al. | 395/129 |
| 5,014,223 | 5/1991 | Tanimori | 338/99 |
| 5,036,316 | 7/1991 | Kemplin | 395/118 |
| 5,157,766 | 10/1992 | Butler et al. | 395/141 |

OTHER PUBLICATIONS

*Xlib Programming Manual for Version 11*, vol. 1, A. Nye, pp. 136–140.
*Computer Graphics Principles and Practice*, Second Edition, Feiner et al pp. 72–109, 855–1010.

*Primary Examiner*—Almis R. Jankus
*Attorney, Agent, or Firm*—Paul S. Drake

[57] ABSTRACT

A method for rendering a graphical polygon, the polygon being defined by connecting edges surrounding a polygon interior, including the steps of computing multiple spans, each span including a portion of the polygon interior and at least one point on an edge of the polygon, computing at least one color value for each computed span, and rendering the spans on a display using the computed color values. In addition, an apparatus for rendering a graphical polygon, the polygon being defined by connecting edges surrounding a polygon interior, including apparatus for computing multiple spans, each span including a portion of the polygon interior and at least one point on an edge of the polygon, apparatus for computing at least one color value for each computed span, and apparatus for rendering the spans on a display using the computed color values.

12 Claims, 6 Drawing Sheets

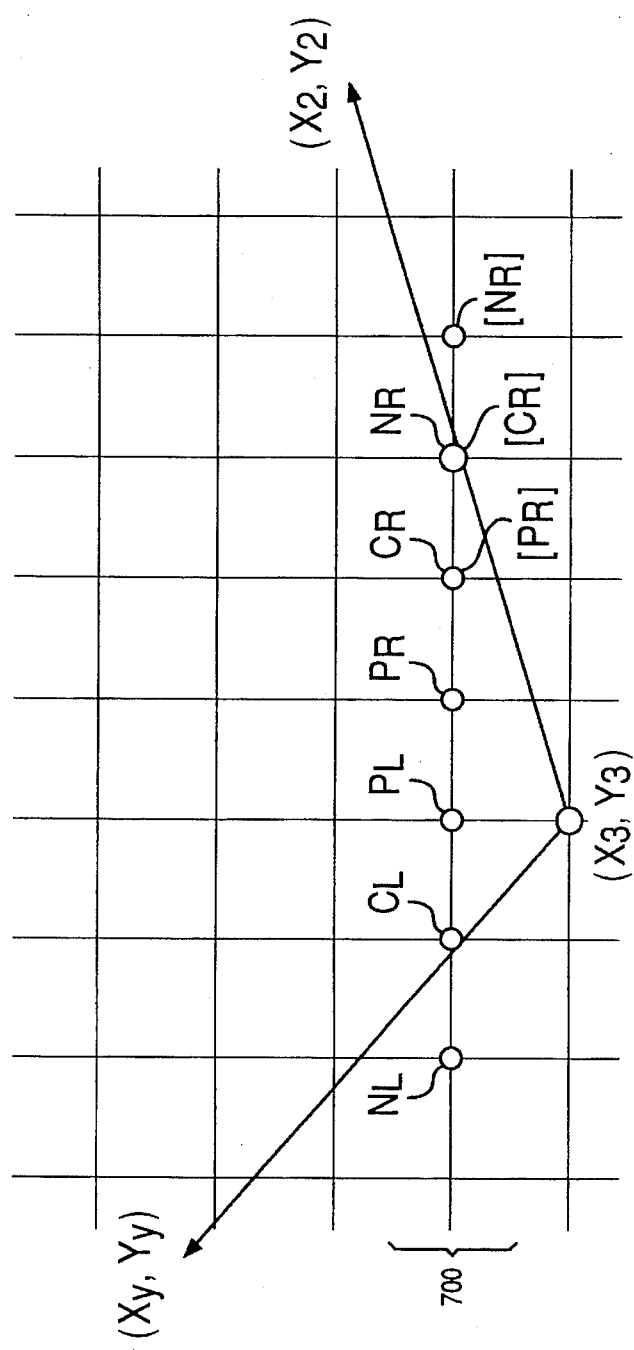

METHOD AND APPARATUS FOR FILLING POLYGONS

TECHNICAL FIELD

The present invention relates generally to computer graphics systems and more particularly to a method and apparatus for more efficiently filling polygons to be displayed.

BACKGROUND ART

In computer graphics systems, it is desired to represent a two and three dimensional graphical picture on a two dimensional display. Typically, such a picture is a construct or image that may be stored in memory as a set of polygons or objects that are tessellated into polygons. To generate the picture on the display, the polygons are then rendered using processes that are typically computationally intensive.

FIG. 1 is an illustration of several graphical polygons to be rendered on a display 10. Polygon 20 is a quadrilateral defined by vertices A, B, C and D. Polygon 21 is a quadrilateral that has been overlapped by polygon 20. As a result, quadrilateral 21 has been modified to be a polygon with seven edges defined by vertices E, F, C, G, H, I and J. Polygon 22 is a triangle also overlapped by quadrilateral 20 such that triangle 22 is a six sided polygon defined by vertices K, L, M, N, B and O. Also shown is a circle that has been tessellated into eight triangles in order to efficiently render the circle using polygons with straight edges. The triangles comprising circle 25 are defined by vertices P, Q, R, S, T, U, V, W and X. For example, triangle 25A of tesselated circle 25 is defined by vertices P, T and U and triangle 25B is defined by vertices P, U and V.

Liang et al., U.S. Pat. No. 4,758,965, discloses one approach to filling polygons being displayed. Liang et al. teaches using two modified Bresenham line generators. The Bresenham line generators are used to generate the edges to the polygon for display while also providing parameters that can be used to generate fill lines connecting the edges by a separate hardware element.

One difficulty in rendering multiple polygons that overlap or touch, including Liang et al., is in rendering the common edges of the polygons. For example, triangles 25A and 25B have edge P→U in common. In many typical rendering techniques, the edge P→U may be rendered twice, firstly when rendering triangle 25A, and secondly when rendering triangle 25B. However, this is an inefficient process where the same pixel may be rendered more than one time thereby slowing the rendering process. In addition, other techniques may disregard rendering borders or use other non-consistent approaches such that there may be gaps on edge P→U that are not rendered during the rendering of either polygon. This results in gaps or blank spaces left in the middle of tessellated or overlapping polygons. Please note also that tesselated circle 25 may typically be a single color such as blue but that polygons 20 and 21 may be a different color such as red and green. In either of the above described cases, gaps which typically remain at the background color, which may be white, and may show through the polygon. In addition, if the edges are rendered multiple times, the edges between conflicting colors may be jagged and displeasing to the eye.

As a result of the above described problems, attempts have been made to provide a set of rules for filling polygons to prevent leaving gaps and also to prevent rendering the same pixels twice. One example of this has been promulgated by the M.I.T. (Massachusetts Institute of Technology) X-Consortium called the X-fill standard. The X-fill standard states that all pixels within the edges of a polygon are to be rendered or filled for that polygon. In addition, if a pixel is directly on or Just outside a polygon edge, then render the pixel only if the pixel is on the right side of the polygon being rendered.

DISCLOSURE OF THE INVENTION

The present invention includes a method for rendering a graphical polygon, the polygon being defined by connecting edges surrounding a polygon interior, including the steps of computing multiple spans, each span including a portion of the polygon interior and at least one point on an edge of the polygon, computing at least one color value for each computed span, and rendering the spans on a display using the computed color values. In addition, the present invention includes an apparatus for rendering a graphical polygon, the polygon being defined by connecting edges surrounding a polygon interior, including apparatus for computing multiple spans, each span including a portion of the polygon interior and at least one point on an edge of the polygon, apparatus for computing at least one color value for each computed span, and apparatus for rendering the spans on a display using the computed color values.

A further understanding of the nature and advantages of the present invention may be realized by reference to the remaining portions of the specification and the drawings.

BRIEF DESCRIPTION OF THE DRAWINGS

FIG. 5 illustrates data describing a polygon that is stored in graphics memory;

FIG. 7 illustrates incrementing polygon edges to the next Y value according to the preferred embodiment of the invention.

BEST MODE FOR CARRYING OUT THE INVENTION

This disclosure describes an improved polygon filling technique. In the preferred embodiment, the filling technique renders each row of pixels of a polygon only once. That is, the edges and the interior of a polygon for a given row are all included in the same span such that the row of pixels are only filled and rendered once. As a result, the present invention does not require that the edges and interior of a polygon be filled and rendered separately.

Figure 2:
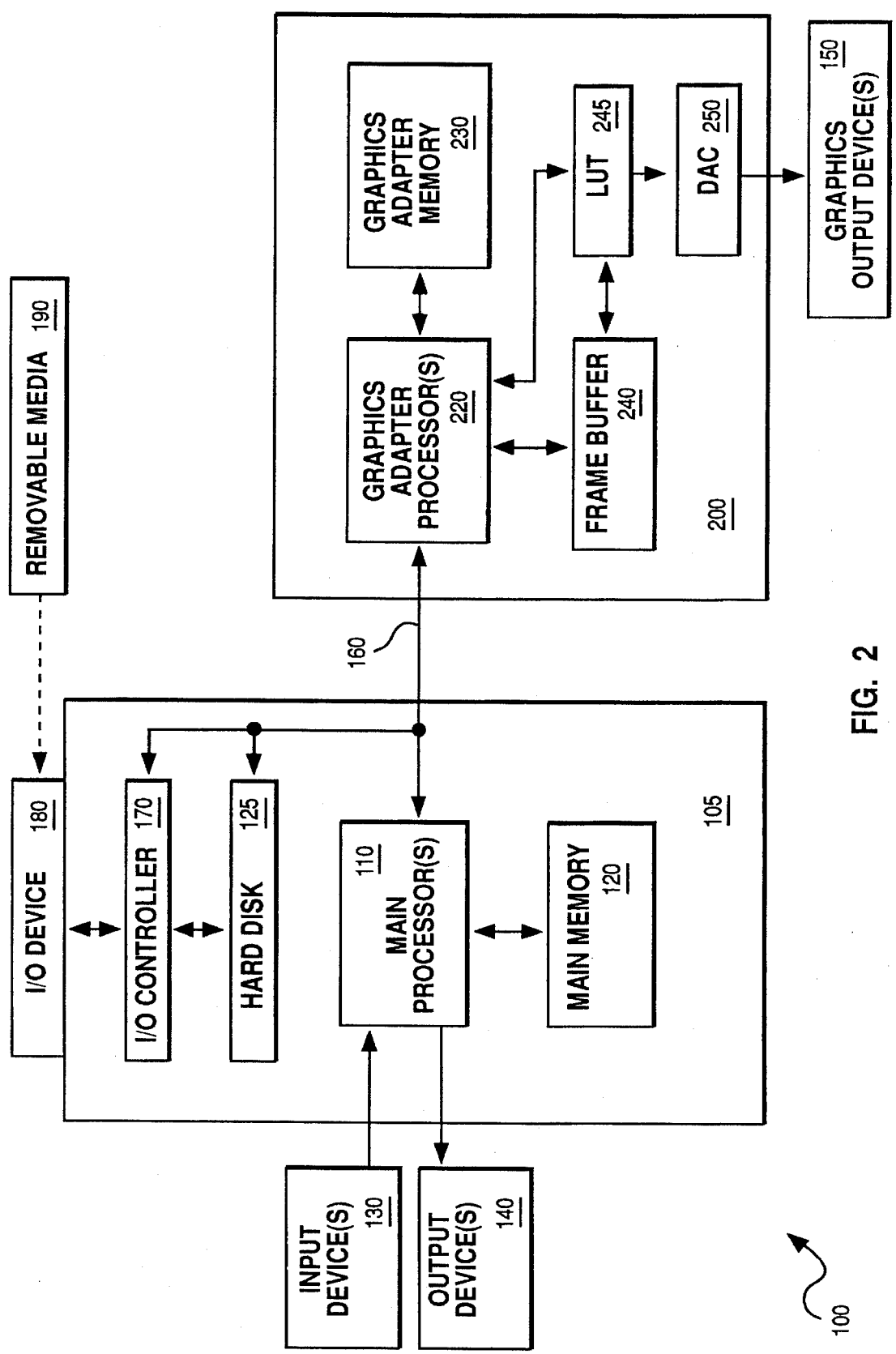
FIG. 2 is a diagram of a typical digital computer utilized by a preferred embodiment of the invention.

FIG. 2 is a block diagram of a typical digital computer 100 utilized by a preferred embodiment of the invention. The computer includes main processor(s) 110 coupled to a memory 120 and a hard disk 125 in computer box 105 with input device(s) 130 and output device(s) 140 attached. Main processor(s) 110 may include a single processor or multiple processors. Input device(s) 130 may include a keyboard, mouse, tablet or other types of input devices. Output device(s) 140 may include a text monitor, plotter or other types of output devices. Computer readable removable media 190, such as a magnetic diskette or a compact disc, may be inserted into an input/output device 180, such as a disk drive or a CD-ROM (compact disc—read only memory) drive. Data is read from or written to the removable media by the I/O device under the control of the I/O device controller 170. The I/O device controller communicates with the main processor through across bus 160. Main memory 120, hard disk 125 and removable media 190 are all referred to as memory for storing data for processing by main processor(s) 110.

The main processor may also be coupled to graphics output device(s) 150 such as a graphics display through a graphics adapter 200. Graphics adapter 200 receives instructions regarding graphics from main processor(s) 110 on bus 160. The graphics adapter then executes those instructions with graphics adapter processor(s) 220 coupled to a graphics adapter memory 230. The graphics processors in the graphics adapter then execute those instructions and updates frame buffer(s) 240 based on those instructions. Graphic processors 220 may also include specialized rendering hardware for rendering specific types of primitives. Frame buffer(s) 240 includes data for every pixel to be displayed on the graphics output device. A RAMDAC (random access memory digital-to-analog converter) 250 converts the digital data stored in the frame buffers into RGB signals to be provided to the graphics display 150 thereby rendering the desired graphics output from the main processor.

Figure 3:
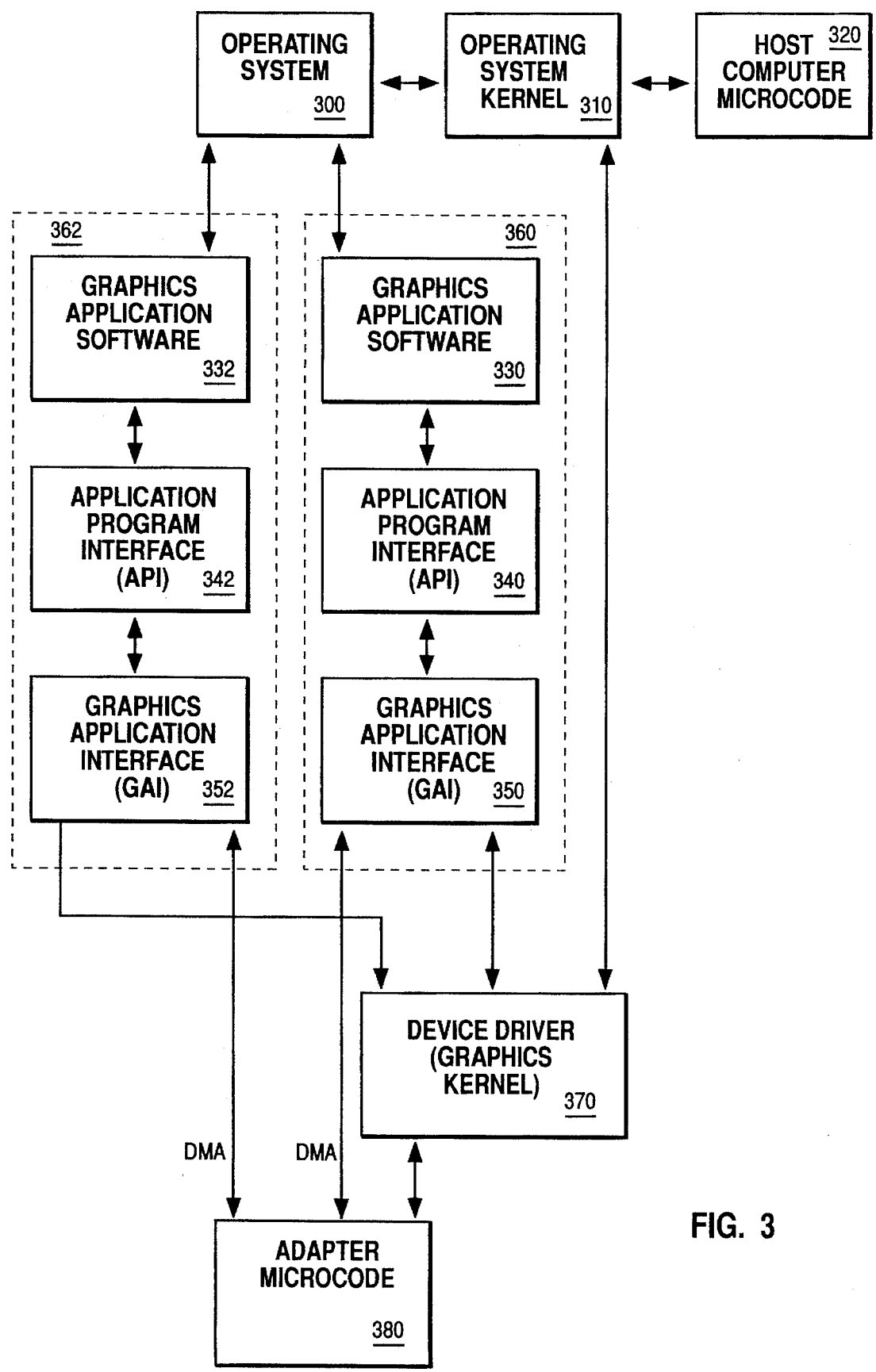
FIG. 3 is a block diagram illustrating the layers of code typically utilized by the host computer and graphics adapter to perform graphics functions.

FIG. 3 is a block diagram illustrating the layers of code typically utilized by the host computer and graphics adapter to perform graphics functions. An operating system 300 such as UNIX provides the primary control of the host computer. Coupled to the operating system is an operating system kernel 310 which provides the hardware intensive tasks for the operating system. The operating system kernel communicates directly with the host computer microcode 320. The host computer microcode is the primary instruction set executed by the host computer processor. Coupled to the operating system 300 are graphics applications 330 and 332. This graphics application software can include software packages such as Silicon Graphic's GL, IBM's graPHIGS, MIT's PEX, etc. This software provides the primary functions of two dimensional or three dimensional graphics. Graphics applications 330 and 332 are coupled to graphics application API (application program interface) 340 and 342, respectively. The API provides many of the computationally intensive tasks for the graphics application and provides an interface between the application software and software closer to the graphics hardware such as a device driver for the graphics adapter. For example, API 340 and 342 may communicate with a GAI (graphics application interface) 350 and 352, respectively. The GAI provides an interface between the application API and a graphics adapter device driver 370. In some graphics systems, the API also performs the function of the GAI.

The graphics application, API, and GAI are considered by the operating system and the device driver to be a single process. That is, graphics applications 330 and 332, API 340 and 342, and GAI 350 and 352 are considered by operating system 300 and device driver 370 to be processes 360 and 362, respectively. The processes are identified by the operating system and the device driver by a process identifier (PID) that is assigned to the process by the operating system kernel. Processes 360 and 362 may use the same code that is being executed twice simultaneously, such as two executions of a program in two separate windows. The PID is used to distinguish the separate executions of the same code.

The device driver is a graphics kernel which is an extension of the operating system kernel 310. The graphics kernel communicates directly with microcode of the graphics adapter 380. In many graphics systems, the GAI, or the API if no GAI layer is used, may request direct access from the GAI or API to the adapter microcode by sending an initial request instruction to the device driver. In addition, many graphics systems also allow the adapter microcode to request direct access from the adapter microcode to the GAI or API if no GAI is used by sending an initial request instruction to the device driver. Both processes will hereinafter be referred to as direct memory access (DMA). DMA is typically used when transferring large blocks of data. DMA provides for a quicker transmission of data between the host computer and the adapter by eliminating the need to go through the display driver other than the initial request for the device driver to set up the DMA. In some cases, the adapter microcode utilizes context switching which allows the adapter microcode to replace the current attributes being utilized by the adapter microcode. Context switching is used when the adapter microcode is to receive an instruction from a graphics application that utilizes different attributes than the adapted microcode is currently using. The context switch is typically initiated by the device driver which recognizes the attribute changes.

Blocks 300–340 are software code layers that are typically independent of the type of graphics adapter being utilized. Blocks 350–380 are software code layers that are typically dependent upon the type of graphics adapter being utilized. For example, if a different graphics adapter were to be used by the graphics application software, then a new GAI, graphics kernel and adapter microcode would be needed. In addition, blocks 300–370 typically reside on and are executed by the host computer. However, the adapter microcode 380 typically resides on and is executed by the graphics adapter. However, in some cases, the adapter microcode is loaded into the graphics adapter by the host computer during initialization of the graphics adapter.

In typical graphics systems, the user instructs the graphics application to construct an image from a two or three dimensional model. The user first selects the location and type of light sources. The user then instructs the application software to build the desired model from a set of predefined or user defined objects. Each object may include one or more coplanar drawing primitives describing the object. For example, a set of drawing primitives such as many triangles may be used to define the surface of an object. The user then provides a perspective in a window to view the model, thereby defining the desired image. The application software then starts the rendering of the image from the model by sending the drawing primitives describing the objects to the adapter microcode through the API, the GAI, and then the device driver unless DMA is used. The adapter microcode then renders the image on the graphics display by clipping (i.e. not using) those drawing primitives not visible in the window and the adapter microcode fills each remaining drawing primitive into visible pixels from the perspective given by the user. The pixels are then loaded into the frame buffer, often with the use of a depth buffer in the case of a three dimensional model. This step is very computationally intensive due to the number of drawing primitives, variables, and pixels involved. The resulting image stored in the frame buffer and displayed on the graphics display typically does not carry the original information such as which drawing primitive or object the pixel was derived from. As a result, the image may need to be rerendered in part or in whole if the window, the user perspective, the model, the lighting, etc. are modified.

In the preferred embodiment, the filling technique could be utilized in many locations such as the adapter microcode which is close to the adapter frame buffer. This approach would also be relatively quick and fairly easy to implement. In addition, the filling technique could be applied in the graphics application software wherein the rendered image is also stored in system memory either prior to the image being rendered or subsequently by the graphics adapter passing the data back up to the graphics application software. This approach would be much slower but would allow for utilization of this technique on preexisting graphics adapters. The filling technique could also be implemented in hardware in the graphics adapter processor. This approach is extremely quick but may necessitate specialized hardware. However, this approach could also enable parallelization of the present invention to further speed the technique. This would allow for rapid filling of primitives to be displayed by the graphics adapter. As would be obvious to one of ordinary skill in the art, the present technique would be applied in many other locations within the host computer or graphics adapter.

Figure 4A:
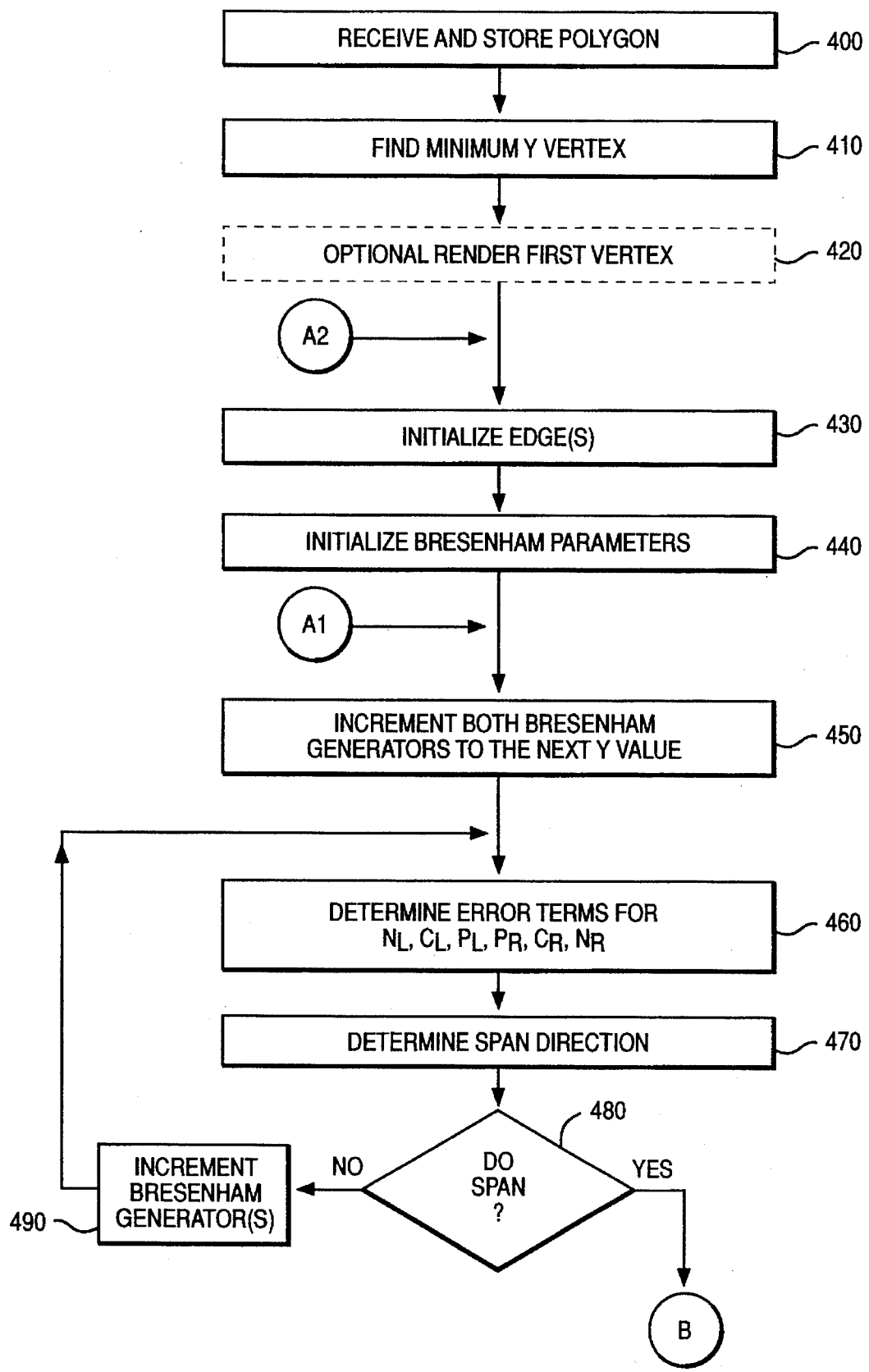
FIGS. 4A–4B are flowcharts illustrating rendering a polygon according to a preferred embodiment of the invention.
Figure 4B:
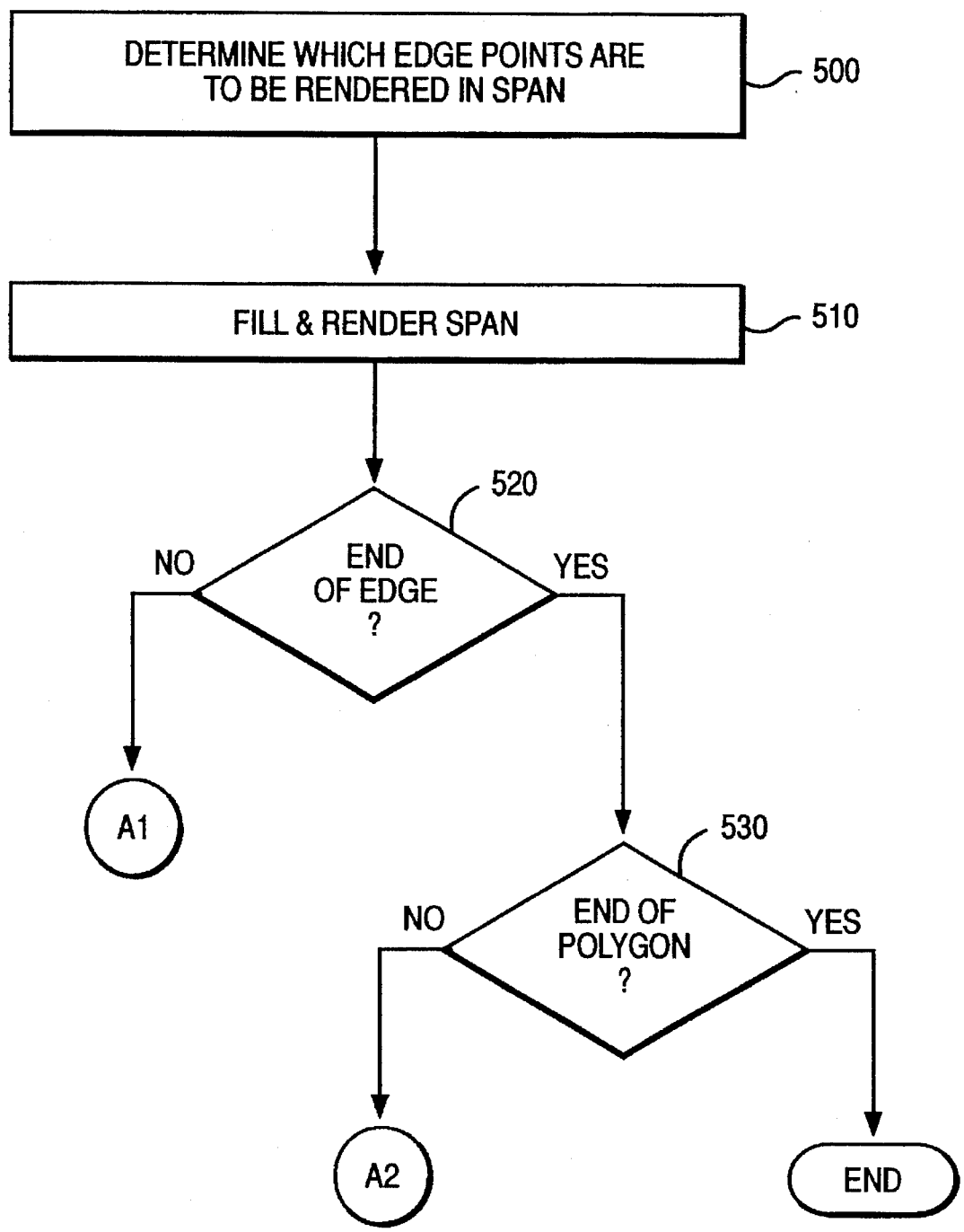

FIGS. 4A–4B are flowcharts illustrating rendering a polygon according to a preferred embodiment of the invention. In a first step 400, a polygon is received and stored in memory for filling and rendering. The polygons received for filling and rendering may be provided by the graphics processor, including tessellated spheres or other objects that have been preprocessed to handle overlapping polygons. In addition, the polygons received for rendering may be from graphics memory or from main memory. In a preferred embodiment, the data or commands received describing the polygon includes N, equal to the number of vertices in the polygon, and (X, Y) coordinates for each of the vertices. For purposes of simplicity, the polygons will be described in two dimensions with X and Y coordinates. However, one of ordinary skill in the art can also apply the techniques described herein to three dimensional objects. It is preferred that the polygons filled using the preferred embodiment either be convex or be concave only in the X direction. Polygons concave in the Y direction may also be handled by applying the present invention with the X and Y variable reversed such that vertical spans are generated.

Figure 1:
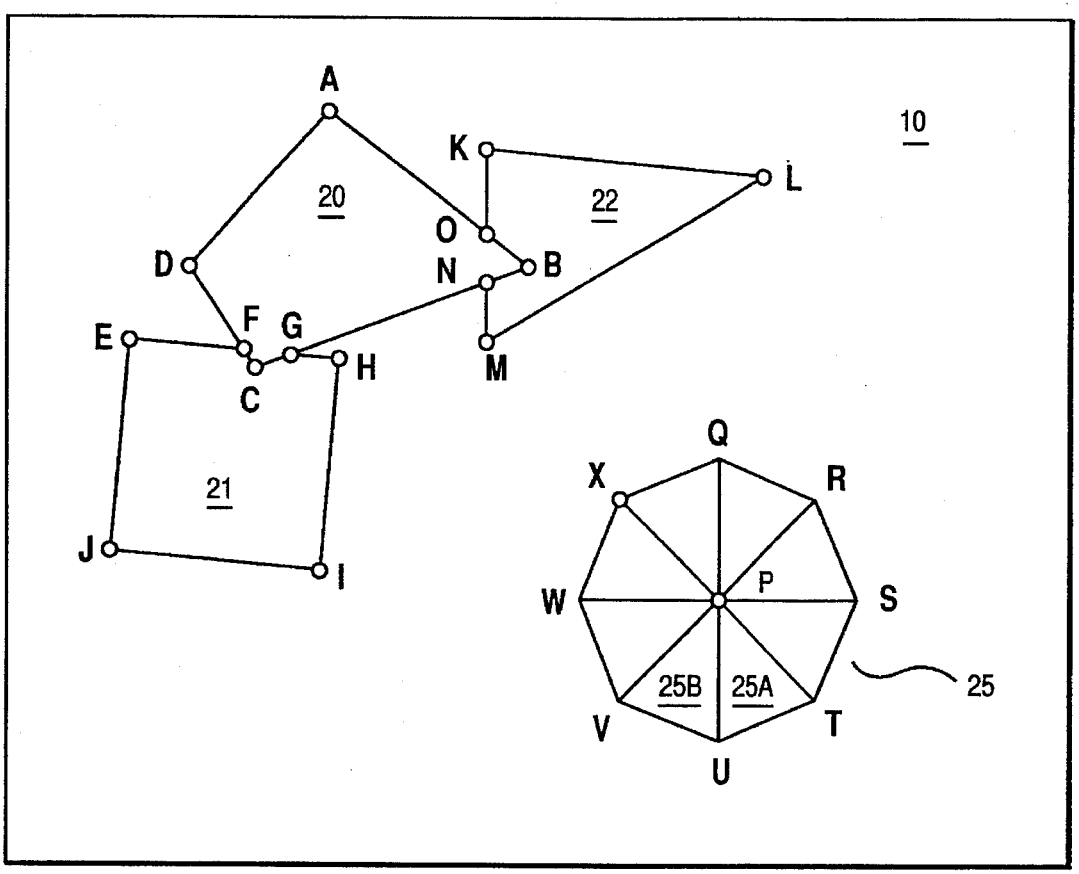
FIG. 1 is an illustration of several graphical polygons to be rendered on a display.

Once received, the polygon data is stored in graphics memory as shown in FIG. 5. Each of the vertices is assigned an identifier 610. For example, vertex A of polygon 20 shown in FIG. 1 has coordinate values (X1,Y1) and is assigned an identifier 00. Please note that the vertices are stored in order of contiguousness in FIG. 5 such that the vertex order of A, B, C, D is retained.

In a second step 410, the vertex having the minimum Y value is determined. For clarity of explanation, the (X,Y) coordinates are O in the lower left-hand corner of the display and increase in value towards the upper right-hand corner. However, it is also common that the point of origin of the axis is in the upper left-hand corner. Using the origin in the lower left-hand corner, the vertex having the minimum y value in the current example is vertex C having identifier value 10. It is from this point that the polygon is split into a series of horizontal spans that will be rendered. However, in alternative embodiments, the rendering may begin at the maximum Y value for utilizing horizontal spans or at the minimum or maximum X value for utilizing vertical spans.

In step 420, the first vertex may be rendered as a point. However, in the preferred embodiment, the first vertex is not rendered unless one of the first edges is a horizontal edge.

In step 430, the right and/or left edges of the polygon are determined. In the current example, the edge C→D would be the left edge and the edge C→B would be the right edge. However, as will be described below, either edge can be assigned as being the left edge or right edge since the direction of the span is determined in step 470 below. In the preferred embodiment, the edges are determined by using the vertex identifiers. For example, the next vertex of the right edge is determined by subtracting one from the C vertex identifier using modulo N arithmetic and the next vertex of the left edge is determined by adding one to the C vertex identifier using modulo N arithmetic. Modulo N arithmetic allows wrapping the vertex list circularly. For example, the next vertex of the right edge is (10-01) modulo 4 in base 2 arithmetic. This results in 01 which is the identifier for vertex B. If this step is not being executed for a first time (i.e. processing continuing from A2), then it may be a single edge being initialized as will be seen below.

In step 440, dual Bresenham line generators are initialized for each edge initialized in step 430. The Bresenham line draw technique is well known in the art and is described in "Computer Graphics, Principles and Practice", second edition, by Foley, Van Dam, Finer and Hughes, 1990, pages 72–81. However, other techniques other than the Bresenham line drawing technique may be utilized. In the current example, the variables initialized for the left edge C→D are dy=|Y4-Y3|, dx=|X4-X3|, d (the error term)=2*|dy|−|dx|, incrNE (Northeast correction factor)=2*(|dy|−|dx|), and incrE =2*|dy|.

Figure 6:
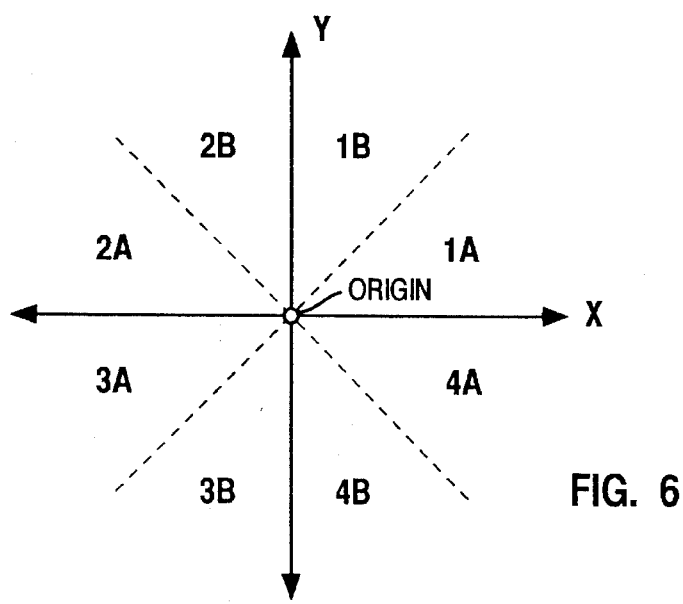
FIG. 6 illustrates eight octants of a cartesian coordinate plane.

Please also note that the Bresenham line draw technique typically works on lines less than 45° in the first quadrant of a typical cartesian coordinate system. Other slopes can be handled by suitable reflections about the principal axis. With reference to FIG. 6, the Bresenham line draw technique is applied unmodified to lines that extend from the origin point into octant 1A. All other lines extending into other octants are reflected or flipped such that they extend into octant 1A. The original octant of the line is retained for use as described below. TABLE 1 below provides a list of variables that have values based on the octant the line travels through. These variables are ndy (negative dy), ndx (negative dx) and mf (majorflip). These variables are used in incrementing X and Y coordinates in the Bresenham Line drawing technique.

In step 450, both Bresenham generators are incremented to the next Y value. FIG. 6 illustrates this step according to the preferred embodiment of the invention. In the current example, the next points will calculate by the Bresenham generator will be current points $C_L$ and $C_R$ (not in brackets []). As is well known in the Bresenham technique, error terms will also be generated for these two points.

TABLE 1

| Octant | OCTANT VARIABLES | | |
|---|---|---|---|
| | ndy | ndx | mf |
| 1A | 0 | 0 | 0 |
| 1B | 0 | 0 | 1 |
| 2A | 0 | 1 | 0 |
| 2B | 0 | 1 | 1 |
| 3A | 1 | 1 | 0 |
| 3B | 1 | 1 | 1 |
| 4A | 1 | 0 | 0 |
| 4B | 1 | 0 | 1 |

In step 460, the error term d is also determined for points to the left and right of each point generated. In the current example as illustrated in FIG. 7, this will be points $N_L$ and $P_L$ (not in brackets[]) for the next and previous points on the left edge, and $P_R$ and $N_R$ (not in brackets[]) for the previous and next vertices for the right edge.

In step 470, it is determined which direction the span currently runs. For example, during the initial processing, the right line may of actually been initialized as the left line and vice versa. In addition, the vertices may have crossed, such as in an upright figure-eight type polygon, concave in the X direction, such that the right edge has now become left edge. The determination of which direction the span runs is obtained by subtracting the X coordinate for $C_L$ from $C_R$. If the result is greater than 0, then the edges are properly labeled. If the result is negative, then the edges are reversed. If the result is zero, then additional processing is required. In the zero case, various variables are reviewed to determine whether the edges are backwards and need to be reversed for filling and rendering. These variables include the signs of the error terms for the next, current, and previous points of each edge (although some cases require a variable be equal to 0), and the mf and ndx variables (based on which octant each edge runs as shown in FIG. 6 above) of each edge. TABLE 2 below provides these conditions for determining whether the edges are backwards and therefore needs to be reversed. In this table all 0's are considered positive. Please note that this step is not necessary if only convex polygons are used and if the edges are initially set to being properly left and right. Processing then continues to step 480.

TABLE 2

CONDITIONS FOR DETERMINING WHETHER EDGE BACKWARDS

| $N_L$ | $C_L$ | $P_L$ | $P_R$ | $C_R$ | $N_R$ | $mf_L$ | $ndx_L$ | $mf_R$ | $ndx_R$ |
|---|---|---|---|---|---|---|---|---|---|
| − | − | + | − | + | + | 0 | 0 | 0 | 0 |
| − | − | + | + | − | − | 0 | 0 | 1 | all |
| − | − | + | + | − | − | 0 | all | 1 | 0 |
| − | + | + | − | − | + | 0 | 1 | 0 | 1 |
| − | + | + | − | 0 | + | 0 | 1 | 0 | 1 |
| − | + | + | + | + | − | 0 | 1 | 1 | 1 |
| + | − | − | − | − | + | 1 | all | 0 | all |
| + | − | − | − | − | + | 1 | 1 | 0 | 1 |
| + | − | − | − | + | + | all | all | all | all |
| + | − | − | + | − | − | 1 | 1 | 1 | 0 |
| + | − | − | + | 0 | − | all | all | all | all |
| + | − | − | + | + | − | all | 1 | all | 1 |
| + | − | − | + | + | + | 1 | 1 | 0 | 1 |
| + | + | − | − | + | + | 1 | 0 | 0 | 0 |
| + | + | − | + | − | − | 1 | 0 | 1 | 0 |
| + | + | − | + | 0 | − | 1 | all | 1 | all |
| + | + | − | + | + | − | all | 0 | all | 1 |
| + | + | − | + | 0 | − | 1 | all | 1 | all |

In step 480, it is determined from these error terms whether or not to render the span given the current error terms provided in step 450. That is, for each edge one of the three points should have a positive error term and one of the three points should have a negative error term. If it is determined that the span may need to include more points on the current y line, then execution proceeds to step 490, else processing continues to step 500. In the current example in FIG. 7, the right line has all three points are within the polygon such that all the error terms will be the same sign. In addition, the left line has two points within the polygon and one outside the polygon such that the error terms do not all have the same sign. As a result, processing would continue to step 490 for incrementing the right line only.

In step 490, the Bresenham generator provides additional points for the edge or edges that may include more points on the span. Processing then returns to step 460 for determining the error terms for the points left and right of each point generated. In the current example of FIG. 7, there would be new values for $P_R$, $C_R$, and $N_R$ shown in brackets.

In step 500 it is determined which edge points are to be filled and rendered in the span. For example, utilizing the X-fill standard, span 700 shown in FIG. 7 would run from $C_L$ to [$C_R$] because they outline the edges of the polygon for that span. $N_L$ and [$N_R$] are both outside the polygon edges, so they would not be filled and rendered. In the preferred embodiment, if $N_L$ were actually on the edge, it would be filled and rendered with the span and if [$N_R$] were actually on the edge it would not be filled and rendered with the span. This would prevent the problems of gaps and duplication described above. However, if a different field rule were used other than X-fill, other such points may be determined to be filled and rendered with the span.

In step 510, the span is filled and rendered. That is, the span is assigned a color or colors and also may be interpolated to provided realistic images. In addition, the end points may be assigned a different color to illustrate the borders. The span is then rendered by loading the values for each of the pixels in the span into the frame buffer. The span is then displayed on the display as a result of loading the frame buffer. In the preferred embodiment, the span is a line with two endpoints and a single color that is passed onto additional apparatus to calculate all the pixels within the line and assign each pixel the color assigned to the span.

In step 520 it is determined whether the rendered span was the last span for either the left or right edge. This is determined by comparing the current Y value for the span to the Y value for each of the ending vertices for the spans. If this is not the last span for either edge, then processing returns to step 450. If this is the last span for either edge, then in step 530 it is determined whether this is the last span in the polygon. This is determined by checking whether this is the last span for both edges and whether the edges end with the same vertex. If so, then rendering of the polygon is completed and processing ends. If not, then processing returns to step 430 above for initialization of a new edge or edges.

The present invention is particularly advantageous because it allows the edges to be rendered in the same span as the filled interior of a polygon. In addition, this allows the edges to be more carefully evaluated as to which points of the edges are rendered to prevent gaps between polygons and to prevent calculating the same points more than once. Furthermore, the present invention allows the polygon, including the edges, to be filled and rendered with very little working storage requirements. That is, no fill bit planes are needed for implementing the present invention.

Although the present invention has been fully described above with reference to specific embodiments, other alternative embodiments will be apparent to those of ordinary skill in the art. For example, the polygons being filled may have nonlinear edges that are calculated by using nonlinear incremental techniques such as the Bresenham circle scan conversion technique. Therefore, the above description should not be taken as limiting the scope of the present invention which is defined by the appended claims.

What is claimed is:

1. A method for rendering a graphical polygon, said polygon being defined by connecting edges surrounding a polygon interior, comprising the steps of:

computing a plurality of spans, each span including a portion of the polygon interior and at least two polygon edge points on each of at least two edges of the polygon, including computing which of the at least two polygon edge points of the span are to be rendered;

computing at least one color value for each computed span; and rendering said spans on a display using said computed color values including only polygon edge points computed to be rendered.

2. The method of claim 1 wherein said step of computing a plurality of spans of pixels includes computing a plurality of parallel spans.

3. The method of claim 2 wherein said step of computing a plurality of spans includes using incrementally computing each span by incrementally computing polygon edges points on each end of each span.

4. The method of claim 3 wherein said step of computing a plurality of spans includes computing which polygon edge points are to be rendered in each span based upon whether the polygon edge points are shared with each other polygons to be rendered.

5. An apparatus for rendering a graphical polygon, said polygon being defined by connecting edges surrounding a polygon interior, comprising:

means for computing a plurality of spans, each span including a portion of the polygon interior and at least two polygon edge points on each of at least two edges of the polygon, including computing which of the at least two polygon edge points of the span are to be rendered;

means for computing at least one color value for each computed span; and means for rendering said spans on a display using said computed color values including only polygon edge points computed to be rendered.

6. The apparatus of claim 5 wherein said means for computing a plurality of spans of pixels includes means for computing a plurality of parallel spans.

7. The apparatus of claim 6 wherein said means for computing a plurality of spans includes means for using incrementally computing each span by incrementally computing polygon edges points on each end of each span.

8. The apparatus of claim 7 wherein said means for computing a plurality of spans includes means for computing which polygon edge points are to be rendered in each span based upon whether the polygon edge points are shared with other polygons to be rendered.

9. A processing system for rendering a graphical polygon, said polygon being defined by connecting edges surrounding a polygon interior comprising:

processing means for processing data;

storage means for storing data to be processed; and graphics processing means coupled to said processing means for processing graphical data said graphics processing means including:
i) means for computing a plurality of spans, each span including a portion of the polygon interior and at least two polygon edge points on each of at least two edges of the polygon, including computing which of the at least two polygon edge points of the span are to be rendered;
ii) means for computing at least one color value for each computed span; and
iii) means for rendering said spans on a display using said computed color values including only polygon edge points computed to be rendered.

10. The data processing system of claim 9 wherein said means for computing a plurality of spans of pixels includes means for computing a plurality of parallel spans.

11. The data processing system of claim 10 wherein said means for computing a plurality of spans includes means for using incrementally computing each span by incrementally computing polygon edges points on each end of each span.

12. The data processing system of claim 11 wherein said means for computing a plurality of spans includes means for computing which polygon edge points are to be rendered in each span based upon whether the polygon edge points are shared with each other polygon to be rendered.

* * * * *

UNITED STATES PATENT AND TRADEMARK OFFICE
CERTIFICATE OF CORRECTION

PATENT NO. : 5,463,723
DATED : October 31, 1995
INVENTOR(S) : Avijit Saha

It is certified that error appears in the above-indentified patent and that said Letters Patent is hereby corrected as shown below:

Col. 9, line 20, after "with" delete "each";
Col. 10, line 10, after "interior" insert --,--;
       line 15, after "data" insert --,--;
       line 39, after "with" delete "each"; and
              delete "polygon" and insert --polygons--.

Signed and Sealed this

Eleventh Day of June, 1996

Attest:

BRUCE LEHMAN

*Attesting Officer*   *Commissioner of Patents and Trademarks*